Figure 1:
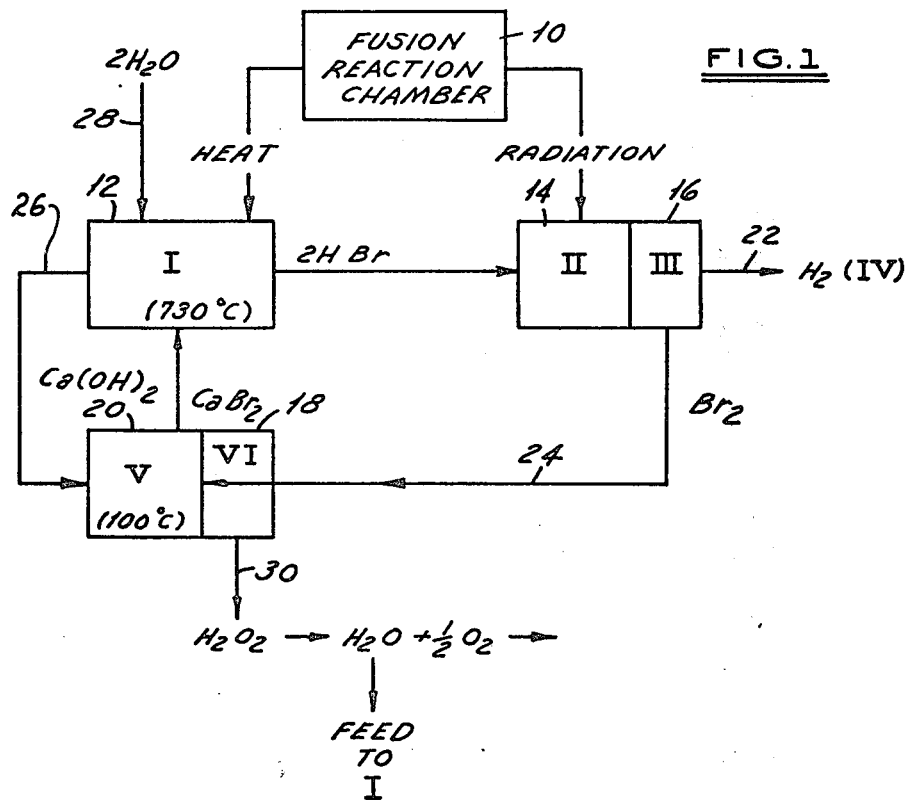

United States Patent [19]

Gomberg

[11] 4,140,600
[45] Feb. 20, 1979

[54] MULTI-STEP CHEMICAL AND RADIATION PROCESS FOR THE PRODUCTION OF GAS

[75] Inventor: Henry J. Gomberg, Ann Arbor, Mich.

[73] Assignee: Texas Gas Transmission Corporation, Owensboro, Ky.

[21] Appl. No.: 667,520

[22] Filed: Mar. 16, 1976

Related U.S. Application Data

[63] Continuation-in-part of Ser. No. 417,000, Nov. 19, 1973, abandoned.

[51] Int. Cl.² .............................................. B01J 1/10
[52] U.S. Cl. .......................................... 204/157.1 H
[58] Field of Search ................. 204/157.1 R, 157.1 H; 423/481, 648, 657

[56] References Cited

PUBLICATIONS

Ellis, The Chemical Action of Ultraviolet Rays (1941), p. 346.
Allen, Chemical Effects of Ionizing Radiation on Simple Inorganic Compounds & Aqueous Solutions, 1948, pp. 4 & 6.

Primary Examiner—Howard S. Williams
Attorney, Agent, or Firm—Laurence R. Brown

[57] ABSTRACT

A multi-step chemical and radiation process for the production of a gas such as hydrogen utilizing radiation from a fusion reactor which includes reacting a hydrolyzable alkaline earth halide with water at a temperature to form an alkaline earth hydroxide and the hydrogen halide, separating the hydrogen halide and subjecting it to radiation from a fusion reaction to produce hydrogen gas and halide molecules. The gas is then separated and utilized as a direct fuel or as a base for hydrocarbon fuels.

10 Claims, 2 Drawing Figures

MULTI-STEP CHEMICAL AND RADIATION PROCESS FOR THE PRODUCTION OF GAS

This is a continuation-in-part of U.S. Ser. No. 417,000 filed Nov. 19, 1973, which is abandoned in favor of this application.

This invention relates to a Multi-Step Chemical and Radiation Process and more particularly to the combining of radiolytic and chemical reactions in a particular sequence to obtain a final product.

It is an object of the present invention to provide a combination of processes, chemical and radiolytic, which increase the efficiency of the use of radiation energy.

BACKGROUND OF THE INVENTION

Much work is presently being done on the achievement of ignition and burn of fusion fuel such as, for example, deuterium-tritium in pellet form. While there are a number of different approaches to this problem, one of them includes the utilization of a source of energy from a laser and particular pellet configurations which will make it possible to achieve ignition and burn in a reaction chamber. Patents which illustrate generally the apparatus which can be used in this type of system are:

Whittlesey 3,378,446 — Apr. 16, 1968
Daiber 3,489,645 — Jan. 13, 1970
Hedstrom 3,762,992 — Oct. 2, 1973

It has been proposed to use radiation from thermonuclear reactions for the dissociation of water to hydrogen and oxygen in one step. This is described in a copending application of Theodor Teichmann, Ser. No. 414,369, filed Nov. 9, 1973 and also in the application of Gomberg and Teitel, Ser. No. 414,370, filed Nov. 9, 1973. The one-step process, involves usually radiation dissociation caused by neutrons, alpha, or x radiation, which may come from Neutron generators, Fission reactions or other radiation sources. The invention involves exposing the target molecule directly to radiation preferably from a fusion or fission source to produce the desired product. The copending application of the same inventor filed concurrently herewith, Ser. No. 674,616, a continuation-in-part of U.S. Ser. No. 416,997 filed Nov. 19, 1973, relates to the use of radiation in chemical processes and is incorporated herein fully by reference as background to the specific chemical processes fully set forth herein. The use of radiation from thermonuclear fusion reactions has a significant advantage over the use of radiation from fission in such processes in that it is less contaminated radioactively with fission fragments and provides a more efficient source of neutron radiation.

When the fission process is used as the radiation source, materials must be exposed directly to the fission fragments in order to obtain effective energy transfer and this also requires that the material be exposed to uranium or plutonium fuel directly. In some instances, the use of uranium dust to be mixed with the reactants is recommended. (See *Advances in Nuclear Science & Technology*, Vol. 1, Edited by Henley and Kouts, Academic Press, 1962, P. 298.) The result is a rather severe contamination of the products by radioactive fission fragments and by the fuel particles themselves. Direct exposure is necessary since about 80 percent of the fission energy is contained in the fission fragments.

In thermonuclear fusion of D-T, 80 percent of the energy is released as fast neutrons and the remaining 20 percent of the energy is released as alpha and X rays. In the fusion reaction, the material to be processed may be exposed directly to the radiation or may be exposed while being confined in a separate container. The latter condition is particularly appropriate for the neutron exposure since the neutrons have an effective penetration characteristic.

Thus, the use of fusion devices, with the resulting high energy neutrons, as well as alpha and X rays, allows for the direct interaction of the radiation with the reactants while limiting radioactivity problems to those caused by neutron activation. This difference alone is extremely significant in considering the use of thermonuclear reactors for chemonuclear processing.

OBJECTS OF THE INVENTION

It is therefore an object of the present invention to utilize a combination process, chemical and radiolytic, which is particularly adapted for use with the fusion process and which greatly increases the efficiency in the use of radiation energy. In addition, the process is relatively simple and the end products may be more readily separated.

It is a further object to provide a system wherein one of the original feed constituents may be completely recycled. The process can result in a chemically recyclable molecule, a new radiosensitive molecule, a principle product, and a by-product.

Other objects and features of the invention will be apparent in the following description and claims wherein the principles of the invention and the use thereof, together with the best mode presently contemplated for the practice of the invention, are set forth.

Drawings accompany the disclosure and the various views thereof may be briefly described as:

FIG. 1, a block diagram of a system for utilizing the process; and

Figure 2:
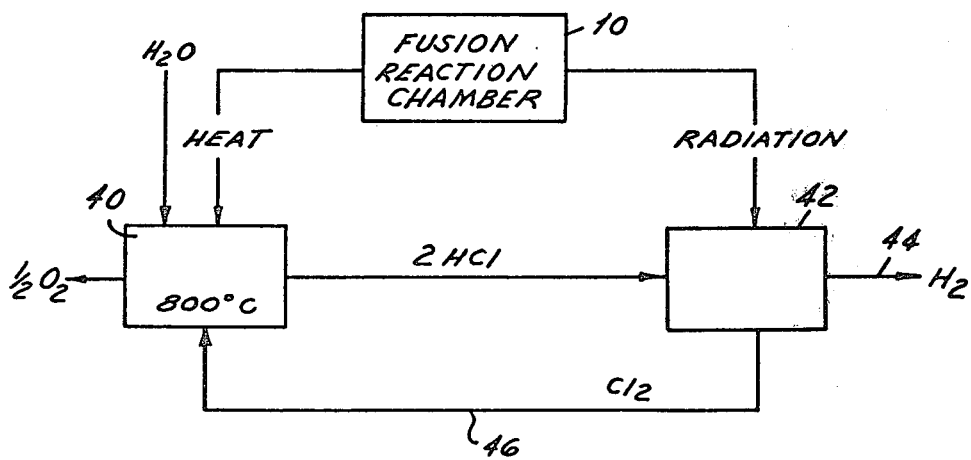

FIG. 2, a simplified block diagram for a modified cycle.

DESCRIPTION OF THE INVENTION

Molecular fragmentation by radiation or "radiolysis" is a known phenomenon. It can be used to form desirable or useful molecular species from feed materials containing larger molecules.

Examples are the formation of hydrogen and oxygen by radiolytic decomposition of water and also the formation of carbon monoxide and oxygen by radiolytic decomposition of carbon dioxide. However, the yield or "G" value for the radiolytic reaction may be too low to be useful or economical. A commonly quoted G value for the yield of hydrogen molecules for radiation of clean liquid water by gamma rays is 0.5. (The G value is the number of product molecules formed per hundred electron volts of energy absorbed.) The present invention involves the combination of processing steps of chemical reactions and radiolytic processes. Depending on the particular material used, the chemical reaction may originate the process followed by a radiolytic step, or an initial radiolytic step may produce molecules suitable for a chemical reaction to produce the final desired product. The multi-step process is so arranged that, except for secondary losses by escape, evaporation, mutation and so forth, all the chemicals, except the original feed material, are completely recycled. The original feed material is selected to provide the final desired product as is the case in the one-step radiolytic process mentioned earlier. In the present process of combining chemical and radiolytic steps, the feed products and the yield products may be the same as in the one-step process. One important objective of the combined steps is to utilize the radiolytic step for exposure of a molecule which is specifically designed to have a high G value. Accordingly, when the chemical reaction is to be followed by the radiolytic process, the chemical reaction is used to create from a combination of the feed material and a chemically recyclable molecule a new radiosensitive molecule and a by-product. After radiolysis of the newly-created radio-sensitive molecule, one fragment is collected as a desired product and the second fragment is reacted with the by-product to recreate both the original recyclable molecule and to provide the second desired product. As an example, an alkaline earth halide and an alkali hydroxide may be reacted to form an alkaline earth hydroxide and an alkali halide. The alkali halide is then subjected to radiolytic dissociation.

One example is the production of hydrogen and oxygen from water as the feed, and calcium bromide as the recyclable molecule.

The reaction proceeds as follows:

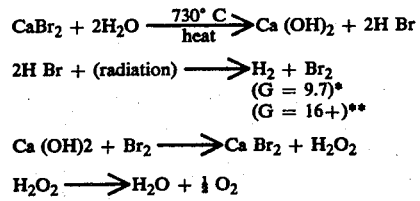

*Lee & Armstrong, Radiolysis of Gaseous Hydrogen Bromide. International J. Applied Radiation, Isotopes, Vol. 19, P. 586 (1968).
**For low pressure, Boyd et al. Low Pressure Anomalies in.. Radiolysis of Gases, Rad. Research 40, P. 255 (1969).

It will be noted that the calcium bromide is conserved and with the input of some heat and radiation, hydrogen and oxygen are formed. Thus, water, heat and ionizing radiation are the only consummable supplies. The hydrogen bromide molecule is known to be truly radiosensitive and is therefore better adapted as a molecule for radiolytic processes than water.

In a second example, the process starts with a suitable radiation sensitive molecule and the products of radiolysis used in a chemical reaction. As an example, carbon dioxide is dissociated to carbon monoxide and oxygen. The carbon monoxide is then reacted with water to form carbon dioxide, hydrogen and oxygen.

The reaction proceeds as follows:

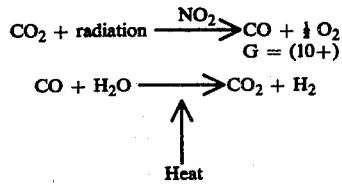

In the above reaction, we note that the carbon dioxide can be recycled. The only feed material, namely water, is consumed through conversion to hydrogen and oxygen. It will be appreciated that the heat needed for the thermochemical reactions (as well as the radiation energy) can be derived from the fusion reaction. Reference is made to *Advances in Nuclear Science & Technology,* Vol. 1, P. 297, where a similar process has been reported in connection with fission energy sources.

A third example involves the use of water and chlorine.

The reaction proceeds as follows:

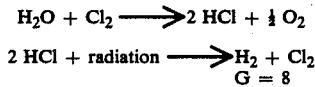

Copending applications, Ser. Nos. 416,998 and 416,997, filed Nov. 19, 1973, are directed to the specific examples above recited.

With reference to the first example above, an alkaline earth halide is reacted with water in a thermochemical reaction as previously indicated. With reference to FIG. 1, it will be seen that heat may be transferred to a vessel 12 directly from a fusion reaction chamber 10 or by means of a heat exchange medium or by heat exchange with hot products which have been exposed to radiation in a vessel 14 which may be referred to as a radiolysis chamber. A separation chamber 16 is provided adjacent the radiolysis chamber. A vessel 18 is connected to vessel 16 wherein the bromine gas may pass from chamber 16, and a reaction chamber 20 is provided to reform the alkaline earth hydroxide. Thus, with reference to the diagram in FIG. 1, in chamber 12 a hydrolyzable alkaline earth halide is reacted with water by heating the mixture to form the alkaline earth hydroxide and the hydrogen halide. Examples of this reaction are:

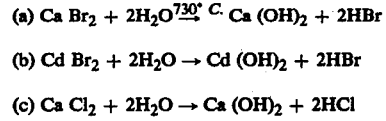

(b) Cd Br$_2$ + 2H$_2$O → Cd (OH)$_2$ + 2HBr (c) Ca Cl$_2$ + 2H$_2$O → Ca (OH)$_2$ + 2HCl

The hydrogen halide is removed from vessel 12 and transferred to vessel 14 where it is subjected to radiation resulting from nuclear fusion in the reaction chamber 10. Thus, the hydrogen halide is exposed to neutrons, plus alpha rays and X rays. Dissociation of the gas takes place and the radiolytic product of hydrogen gas will exit through a suitable conduit 22 and the halide gas will be carried through a suitable conduit 24 to the chamber 18. Well-known processes of separation will take place in chamber 16 so that the halide gas can be separated from the principal product, hydrogen. The hydrogen is pumped away for storage and eventual use as a fuel, either in the pure state or as a manufactured hydrocarbon. The halide gas is reacted with the alkaline earth hydroxide resulting from the chemical reaction which has reached chamber 20 through a conduit 26. Thus, the hydrolyzable salt is reformed in the chamber 20 and can be suitably transferred back to chamber 12 to react with the fresh feed water which is entering through the conduit 28. The product water and oxygen from chamber 20 are pumped away through conduit 30. If desired, the product water can be returned to the conduit 28 and the oxygen may be recovered if desired for further use elsewhere.

In FIG. 2, a system is shown for the reaction of the third example, above described, utilizing chlorine. Other halides might be used. The fusion reaction chamber 10 is positioned to transfer heat to the chemical reaction vessel 40 and to transfer radiation to the radiolytic chamber 42. In the cycle involved here, chlorine will be introduced into chamber 40 along with water, and under the influence of heat in the area of 800° C., (see *Chlorine: Its Manufacture, Properties and Uses*, J. S. Sconce, Editor in Chief, Van Nostrand Reinhold Co., 1962) there will be produced oxygen and hydrochloric acid which passes to the chamber 42 where it is subject to dissociation into hydrogen and chlorine. These gases are suitably separated in chamber 42 so that hydrogen may pass out of the conduit 44 and chlorine may move through the conduit 46 back to the chemical reaction chamber 40.

It will be appreciated that, in the above examples, the alkaline earths could be selected from Group II of The Periodic Table including Be, Mg, Ca, Zn, Sr, Cd, Ba and Hg. The alkali combinations could be selected from Group I including H, Li, Na, K, Cu, Rb, Ag, Cs and Au. The halides, of course, in Group VII include F, Cl, Br and I.

The multi-step concept is applicable to many processes and products. The principal points are:

(a) Initially introduction, or creation, of a radiation sensitive molecule
(b) By radiolysis, creation of an important chemical intermediate, or final product
(c) Recycling of all chemicals except the feed material and desired final product.

The major objective of the combined process is to have radiolysis occur in a selected radiation sensitive molecule with a high G value.

It should be noted, however, that the fraction of the input radiation energy which is not utilized directly for radiolysis will be absorbed and converted to heat. The system can therefore be designed so that the driving high energy radiation and heat are both supplied from one and the same source, i.e., fast neutrons and other radiations from thermonuclear reaction.

Another feature of these processes, unlike direct radiolysis of water, where the hydrogen and oxygen emerge together, is that the hydrogen and oxygen are produced separately in different steps and in physically separated zones of the equipment. This reduces explosion hazard and makes purification of the final product easier.

What is claimed is:

1. A process for producing hydrogen which comprises:

(a) reacting a hydrolyzable alkaline earth halide with water at a temperature to form an alkaline earth hydroxide and the hydrogen halide,
(b) removing the hydrogen halide,
(c) subjecting the hydrogen halide to ionizing radiation to produce hydrogen gas and halide molecules, and
(d) separating the hydrogen.

2. A process as defined in claim 1 wherein the ionizing radiation is derived from a fusion reaction process.

3. A process as defined in claim 1 which includes reacting the halide molecules with alkaline earth hydroxide to produce a recyclable hydrolyzable alkaline earth halide for reprocessing in the cycle.

4. A process of producing hydrogen which comprises:

(a) reacting calcium bromide and water at about 730° C. to produce calcium hydroxide and hydrogen bromide,
(b) separating the hydrogen bromide,
(c) exposing the hydrogen bromide to ionizing radiation to produce dissociation into hydrogen and bromine, and
(d) separating the hydrogen.

5. A process as defined in claim 4 wherein the ionizing radiation is derived from a fusion reaction process.

6. A process as defined in claim 4 which includes reacting the bromine with the calcium hydroxide to produce the starting material calcium bromide.

7. A process of producing hydrogen which comprises:

(a) reacting a starting hydrolyzable halide formed from a selected one of a group including earth elements Mg, Ca, Zn, Sr, Cd, and alkaline elements Li, Na, K, Cu, Cs, with water at a temperature to form in a chemical reaction a hydroxide and a hydrogen halide,
(b) removing the hydrogen halide,
(c) subjecting the hydrogen halide in a radiolytic step to ionizing radiation to produce hydrogen gas and halogen molecules, and
(d) separating the hydrogen for use as a fuel and fuel base.

8. A process as defined in claim 7 in which a fusion reaction process produces heat and ionizing radiation, the thermochemical reaction is driven by heat from the fusion reaction, and the radiolytic step is driven by radiation from the fusion reaction.

9. A process as defined in claim 7 which includes reacting the halogen molecule with the hydroxide to produce the hydrolyzable halide as the starting material.

10. A process as defined in claim 7 including the step of generating both heat and radiation used in the process from a reactor producing neutron, alpha ray and X ray radiation.

* * * * *